(12) United States Patent
Yoon et al.

(10) Patent No.: US 7,974,290 B2
(45) Date of Patent: Jul. 5, 2011

(54) TDMA PASSIVE OPTICAL NETWORK OLT SYSTEM FOR BROADCAST SERVICE

(75) Inventors: Bin Yeong Yoon, Daejeon (KR); Dong Soo Lee, Gwangju (KR); Jong Deog Kim, Daejeon (KR); Sung Woong Park, Gyeonggi-do (KR); Mun Seob Lee, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/832,392

(22) Filed: Jul. 8, 2010

(65) Prior Publication Data

US 2010/0272437 A1    Oct. 28, 2010

Related U.S. Application Data

(62) Division of application No. 11/635,182, filed on Dec. 7, 2006, now Pat. No. 7,760,734.

(30) Foreign Application Priority Data

Dec. 9, 2005  (KR) .................. 10-2005-0121026
Mar. 30, 2006  (KR) .................. 10-2006-0029083

(51) Int. Cl.
*H04L 12/28*  (2006.01)
*H04J 14/08*  (2006.01)

(52) U.S. Cl. ........................................ 370/392; 398/99

(58) Field of Classification Search ........................ None
See application file for complete search history.

(56) References Cited

U.S. PATENT DOCUMENTS 7,330,656 B2 * 2/2008 Lee et al. .................. 398/78
2002/0150097 A1 * 10/2002 Yen et al. .................. 370/390
(Continued)

FOREIGN PATENT DOCUMENTS

JP    2003-244185 A    8/2003
(Continued)

OTHER PUBLICATIONS

Terauchi Hironori, et al; "VLAN Control in Ethernet PON System", IEIC Technical Report (Institute of Electronics, Information and Communication Engineers), Journal Code: S0532B; ISSN: 0913-5685, vol. 102, No. 422(CS2002 108-114); pp. 13-17, Nov. 2002.

(Continued)

*Primary Examiner* — Pankaj Kumar
*Assistant Examiner* — Eunsook Choi
(74) *Attorney, Agent, or Firm* — Ladas & Parry LLP

(57) ABSTRACT

Provided is a TDMA (time division multiple access) PON (passive optical network) OLT (optical line terminal) system for a broadcast service, including packet processor determining information according to types of frames (unicast, multicast, and broadcast frames) and a switch output port using header information (an IP address of a packet header, MAC (medium access control) addresses of Ethernet frames, and the like) of data received from an external node or the ONT (optical network terminal) and attaching the information to header parts of the frames to generate second data, a switch copying the second data by a predetermined number of times according to a transmission method and transmitting the second data to a corresponding destination output port according to the identification codes, M TDMA PON MAC processors removing the identification codes added to the second data and converting the second data into TDMA PON frames, and M optical transceivers converting the TDMA PON frames into optical signals and transmitting the optical signals to an ONT.

7 Claims, 2 Drawing Sheets

U.S. PATENT DOCUMENTS

| | | | |
|---|---|---|---|
| 2002/0159120 A1* | 10/2002 | Kitayama et al. | 359/168 |
| 2003/0117998 A1* | 6/2003 | Sala et al. | 370/351 |
| 2003/0152389 A1 | 8/2003 | Sala et al. | |
| 2004/0109450 A1 | 6/2004 | Kang et al. | |
| 2004/0184806 A1* | 9/2004 | Lee et al. | 398/79 |
| 2004/0264961 A1* | 12/2004 | Nam et al. | 398/58 |
| 2005/0002390 A1 | 1/2005 | Kim et al. | |
| 2005/0058135 A1* | 3/2005 | Sisto et al. | 370/395.2 |
| 2005/0152697 A1 | 7/2005 | Lee et al. | |
| 2006/0093356 A1* | 5/2006 | Vereen et al. | 398/33 |
| 2006/0257149 A1* | 11/2006 | Hirth et al. | 398/72 |
| 2007/0092249 A1* | 4/2007 | Akasaka et al. | 398/49 |

FOREIGN PATENT DOCUMENTS

| | | |
|---|---|---|
| KR | 1020050022110 A | 3/2005 |
| KR | 1020050073899 A | 7/2005 |

OTHER PUBLICATIONS

USPTO OA mailed Aug. 20, 2009 for U.S. Appl. No. 11/635,182.
USPTO OA mailed Dec. 4, 2009 for U.S. Appl. No. 11/635,182.
USPTO NOA mailed Apr. 2, 2010 for U.S. Appl. No. 11/635,182.
USPTO OA mailed Dec 4, 2009 for U.S. Appl. No. 11/635,182.

* cited by examiner

TDMA PASSIVE OPTICAL NETWORK OLT SYSTEM FOR BROADCAST SERVICE

CROSS-REFERENCE TO RELATED PATENT APPLICATION

This application claims the benefit of Korean Patent Application No. 10-2005-0121026, filed on Dec. 9, 2005, and Korean Patent Application No. 10-2006-0029083, filed on Mar. 30, 2006, in the Korean Intellectual Property Office, and allowed U.S. patent application Ser. No. 11/635,182 filed on Dec. 7, 2006, the disclosures of which are incorporated herein in their entirety by reference.

BACKGROUND OF THE INVENTION

1. Field of the Invention

The present invention relates to a system for a broadcast service in a passive optical network (PON) system, and more particularly, to a time division multiple access (TDMA) PON optical line terminal (OLT) system enabling a simultaneous broadcast and communications service through a single optical cable.

2. Description of the Related Art

Network businesses have invested heavily in triple play services (TPSs) capable of processing broadcasts, sound, and data in one network.

Many more downstream bandwidths are required toward an optical network terminal (ONT) in an OLT to provide a broadcast service such as Internet protocol television (IPTV) to subscribers using a fiber to the home (FTTH) network.

Downstream traffic is heavier than upstream traffic in an ultrahigh speed Internet network. Thus, if a broadcast service is additionally provided, a ratio of the downstream traffic to the upstream traffic is seriously asymmetric.

However, in a gigabit PON (GPON) system recommended in ITU-T G.984.1.about.2, a ratio of downstream traffic to upstream traffic may be within a range between 1:1 and 1:4. In a case of an Ethernet PON (EPON) system standardized in IEEE 802.3ah, a ratio of downstream traffic to upstream traffic is 1:1.

Therefore, in a current TDMA PON system and a current network structure, network efficiency is deteriorated due to expected serious asymmetry of upstream and downstream speeds. This increases cost of OLT equipment.

A multicasting method used in a TDMA-PON to solve this problem may delay a change of a channel and thus cause inconvenience to a user. Also, a broadcasting method using additional wavelength division multiplexing requires a high-priced optical transceiver and a high-priced optical amplifier to provide only a broadcast signal.

SUMMARY OF THE INVENTION

The present invention provides a time division multiple access (TDMA) passive optical network (PON) optical line terminal (OLT) system for a broadcast service.

According to an aspect of the present invention, there is provided a transmitter of a TDMA PON OLT system for a broadcast, including: a packet processor determining whether first data is received as a broadcast, multicast, or unicast based on a header of the first data and adding identification codes for determining an output port to generate second data; a switch copying the second data by a predetermined number of times and transmitting the second data to a corresponding output port according to the identification codes; M TDMA PON MAC processors removing the identification codes added to the second data and converting the second data into TDMA PON frames; and M optical transceivers converting the TDMA PON frames into optical signals and transmitting the optical signals to an ONT.

According to another aspect of the present invention, there is provided a receiver of a TDMA PON OLT system for a broadcast service, including: M optical receivers receiving optical signals having burst mode characteristics, the optical signals transmitted from an ONT and extracting data from the optical signals; M TDMA PON MAC processors recovering TDMA PON frames from the extracted data; a switch multiplexing the recovered TDMA PON frames; and a packet processor recovering one of Ethernet frame data and packet data from the multiplexed frames.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a preferred embodiment of the present invention will be described with reference to the attached drawings.

Figure 1:
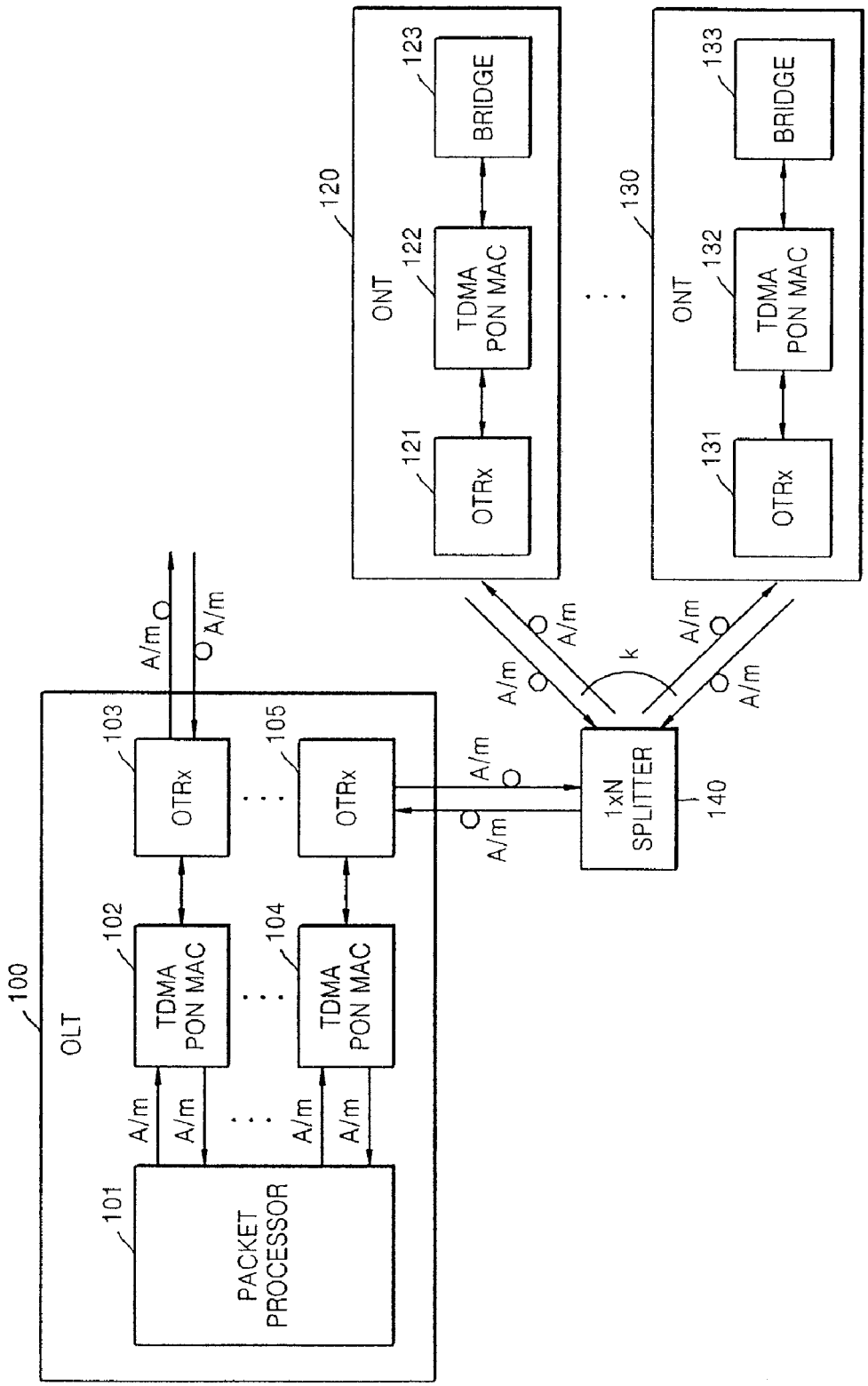
FIG. 1 is a view illustrating a method of transmitting frames in an existing TDMA PON OLT system.

FIG. 1 is a view illustrating a method of transmitting frames in an existing time division multiple access (TDMA) passive optical network (PON) optical line terminal (OLT) system.

TDMA PON technology such as an Ethernet PON (EPON) and a gigabit PON (GPON) are standardized in a method of transmitting data to subscribers using a fiber to the home (FTTH) network. A TDMA PON uses continuous mode transmission technology as existing optical transmission technology during a downstream transmission of a data signal from an OLT to an optical network terminal (ONT). However, the TDMA PON uses burst mode transmission technology for transmitting packet data received from each ONT during a upstream transmission of the data signal from the ONT to the OLT.

Downstream traffic for a transmission from an OLT 100 toward ONTs 120 through 130 will now be described. A packet processor 101 of the OLT 100 processes levels L3 through L7 of data received from an external node or the ONTs 120 through 130 and transmits the processed frames to TDMA PON medium access control (MAC) processors 102 and 104.

In the case where a packet processor having a data processing performance A is connected to TDMA PON MAC processors having a link speed of A/m, M TDMA PON MAC processors 102 and 104 are multiplexed and connected to one another to reduce the number of elements. The TDMA PON MAC processors 102 and 104 transmit TDMA PON frames having logical link identifiers (LLIDs) or optical network unit (ONU) IDs to optical transceivers 103 and 105 according to the standard recommendations of a GPON and an EPON.

The optical transceivers 103 and 105 convert electric signals into optical signals and transmit the optical signals to a splitter 140 through optical lines according to the standard recommendations. The splitter 140 splits each of the optical signals into k optical signals within a splitting range according to the standard recommendations and transmits the k optical signals to the ONTs 120 through 130.

Optical transceivers 121 through 131 of the ONTs 120 through 130 convert optical signals into electric signals and transmit the electric signals to TDMA PON MAC processors 122 through 132. The TDMA PON MAC processors 122 through 132 extract data from the electric signals to recover the TDMA PON frames transmitted from the OLT 100.

The TDMA PON MAC processors 122 through 132 convert the recovered TDMA PON frames into Ethernet frames and transmit the Ethernet frames to bridges 123 through 133 according to the standard recommendations of the GPON and the EPON. The bridges 123 through 133 transmit the Ethernet frames to destination subscriber devices.

Upstream signals transmitted from the ONTs 120 through 130 to the OLT 100 will now be described. The bridges 123 through 133 of the ONTs 120 through 130 transmit Ethernet frames received from subscriber devices to the TDMA PON MAC processors 122 through 132.

The TDMA PON MAC processors 122 through 132 convert the Ethernet frames into TDMA PON frames and transmit the TDMA PON frames to the optical transceivers 121 through 131 only when a transmission of frames to the TDMA PON MAC processors 122 through 132 is allowed under the control of the OLT 100.

The optical transceivers 121 through 131 convert electric signals into optical signals and transmit the optical signal only when a transmission of frames is allowed and intercept the optical signals when the transmission of the frames is not allowed, so as to prevent signal interference among the ONTs 120 through 130. Such a signal transmission method is called a burst mode.

The splitter 140 multiplexes signals received from k ONTs and transmits the multiplexed signals to the optical transceiver 103 of the OLT 100.

The optical transceiver 103 extracts data from an optical signal transmitted in a burst mode and transmits the extracted data to the TDMA PON MAC processor 102.

The TDMA PON MAC processor 102 processes frames and transmits the processed frames to the packet processor 101 according to the standard recommendations. The packet processor 101 processes packets transmitted from a maximum number, M, of TDMA PON MAC processors 102 and 104 and transmits the processed packets to a destination port of an Uplink or a PON.

More downstream bandwidths are required to provide a broadcast service such as an IPTV to subscribers using an FTTH network than in an existing network. Downstream traffic is heavier than upstream traffic in an ultrahigh speed internet network. If a broadcast service is additionally provided, a ratio of the downstream traffic to the upstream traffic is increasingly asymmetric. In an asymmetric TDMA PON system, network resources are not efficiently used due to an asymmetric traffic characteristic. Thus, cost of equipment and facilities is increased.

In an existing TDMA PON system, broadcast frames requiring many bandwidths are not transmitted to all PON subscribers due to restrictions on bandwidths. However, an IPTV broadcast service is provided to all the PON subscribers by multicasting using an Internet Group Management Protocol (IGMP) or is broadcast using a wavelength division multiplexing method using a separate wavelength from a data communication signal.

Multicasting may cause inconvenience to users due to a channel change delay. The broadcasting method using the wavelength division multiplexing method additionally requires a high-priced optical receiver and a high-priced optical amplifier for only a broadcast signal and thus increases cost for constituting the existing TDMA PON system.

Figure 2:
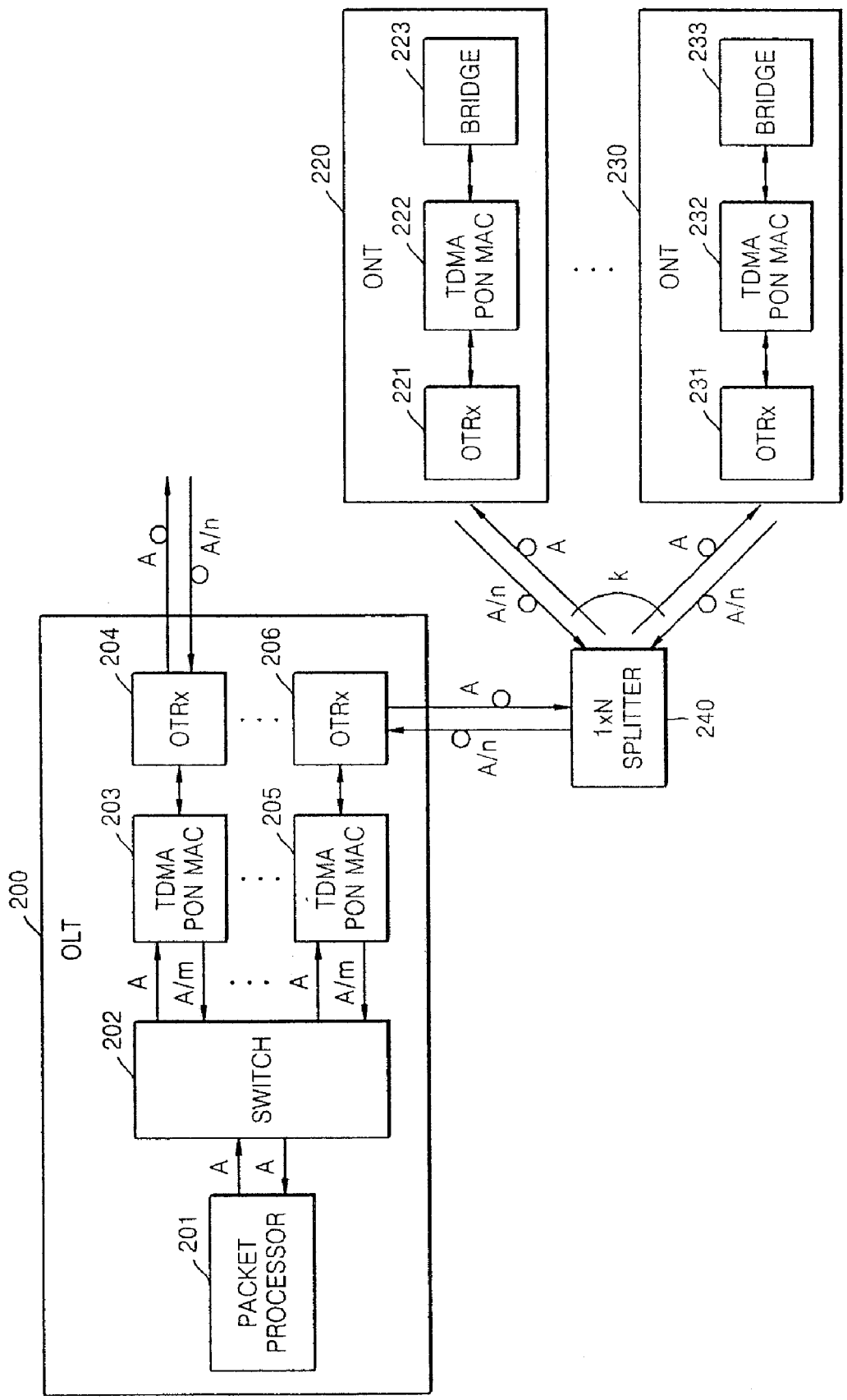
FIG. 2 is a view illustrating a configuration of a TDMA PON OLT system for providing a broadcast service such as an IPTV according to the present invention.

FIG. 2 is a view illustrating a configuration of a TDMA PON OLT system for providing a broadcast service such as an IPTV according to an embodiment of the present invention The TDMA PON OLT system according to the present embodiment includes a packet processor 201, a switch 202, TDMA PON MAC processors 203 and 205, and optical transceivers 204 and 206. In the TDMA PON OLT system, a means of transmission is classified into downstream transmission from an OLT to an ONT and a upstream transmission from the ONT to the OLT.

The packet processor 201 of an OLT 200 processes levels L3 through L7 of data received from ONTs 220 through 230 or from an external node in a downstream direction, generates an internal frame including information about a destination TDMA PON port and frame identifications, and transmit the internal frame to the switch 202.

The packet processor 201 recovers frames from data received from a maximum number, M, of TDMA PON MAC processors 203 and 205 in a upstream direction and transmits the frames to an Uplink or a TDMA PON port according to address information of a packet header or an Ethernet header.

The switch 202 of the OLT 200 is connected to the maximum number, M, of TDMA PON MAC processors, receives a frame having a bandwidth with a maximum amount, A, of traffic from the packet processor 201 in a downstream direction, classifies the frame into broadcast, multicast, and unicast frames, copies and transmits the broadcast frame to all of the m TDMA PON MAC processors, transmits the unicast frame to a destination TDMA PON MAC processor, and copies and transmits the multicast frame to TDMA PON MAC processors designated as destinations.

The switch 202 multiplexes the frames received from the maximum number, m, of TDMA PON MAC processors in the upstream direction and transmits the multiplexed frames to the packet processor 201 having a maximum packet processing performance A.

Here, M denotes the number of TDMA PON MAC processors that may be connected to a packet processor through a switch and is determined by a user by measuring upstream traffic received from the TDMA PON MAC processors. If the user does not allow any frames to be lost or corrupted, transmission speeds of upstream data of M TDMA PON MAC processors may be measured so that the largest transmission speed is divided by a maximum link speed (A) in a downstream direction so as to determine a value resulting from the division as M.

However, if the user allows some low level frames to be lost, data transmission speeds may be lowered. Thus, the value of m may be increased so as to connect many more TDMA PON MAC processors to the packet processor 201.

The TDMA PON MAC processors 203 and 205 receive frames from the switch 202 in a downstream direction, process MAC functions for TDMA PON downstream signals, and transmit the frames to the optical transceivers 204 and 206.

The TDMA PON MAC processors 203 and 205 receive signals from the optical transceivers 204 and 206 in a upstream direction, process MAC functions for TDMA PON upstream signals, and transmit the signals to the switch 202.

The optical transceivers 204 and 206 of the OLT 200 receive frames from the TDMA PON MAC processors 203 and 204 in a downstream direction, convert electric signals into optical signals having speeds of A/n, and transmit the optical signals to a splitter 240. Here, n denotes a ratio of a downstream link speed to a upstream link speed.

Since an EPON has a 1 G speed in a downstream direction and a 1 G speed in a upstream direction, n=1. In the case of a GPON having a 2.5 G speed in a downstream direction and a 1.25 G speed in a upstream direction, n=2. Power to a number, k, of branches of a splitter must be appropriately adjusted during a conversion into an optical signal.

The optical transceivers 204 and 206 of the OLT 200 extract data from optical signals transmitted in a burst mode in a upstream direction and transmit the extracted data to the TDMA PON MAC processors 203 and 205. The TDMA PON MAC processors 203 and 205 process frames according to standard recommendations and transmit the processed frames to the switch 202.

The splitter 240 splits an optical signal having a transmission speed A in a downstream direction and transmits the split optical signals to the ONTs 220 through 230. k denotes the number of branches of the splitter 240. The splitter 240 multiplexes optical signals received from the ONTs 220 through 230 in a upstream direction and transmits the multiplexed optical signals to the optical transceivers 204 and 206 of the OLT 200.

The ONTs 220 through 230 respectively include optical transceivers 221 and 231, TDMA PON MAC processors 222 and 232, and bridges 223 and 233. The optical transceivers 221 and 231 convert optical signals into electric signals and transmit the electric signals to the TDMA PON MAC processors 222 and 232.

The optical transceivers 204 and 206 convert electric signals into optical signals in a upstream direction, transmit the optical signals only when a transmission of frames is allowed, and intercepts the optical signals, so as to prevent signal interference among the ONTs 220 through 230.

The TDMA PON MAC processors 222 and 232 recover TDMA PON frames received from the OLT 200 in a downstream direction, convert only TDMA PON frames transmitted the TDMA PON MAC processors 222 and 232 into Ethernet frames, and transmit the Ethernet frames to the bridges 223 and 233. The TDMA PON MAC processors 222 and 232 convert the Ethernet frames into TDMA PON frames and transmit the TDMA PON frames to the optical transceivers 221 and 231 only when the OLT 200 allows frames to be transmitted thereto.

The bridges 223 and 233 process frames in a downstream direction and transmit the frames to destination subscriber devices according to a destination address of an Ethernet header. The bridges 223 and 233 transmit frames received from the destination subscriber devices, i.e., the frames to be transmitted to the OLT 200, to the TDMA PON MAC processors 222 and 232.

As described above, in a TDMA PON OLT system according to the present invention, a broadcast service such as an IPTV can be efficiently broadcast using a TDMA PON-based FTTH network.

Thus, a time delay of zapping caused by providing a broadcast service such as an IPTV in an existing TDMA PON OLT system can be reduced.

Also, upstream and downstream transmission speeds can be asymmetrically set in the TDMA PON-based FTTH network. Thus, a maximum number of subscribers can be accommodated. As a result, network resources can be efficiently used so as to efficiently and economically provide the IPTV service in the TDMA PON-based FTTH network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A transmitter of a TDMA (time division multiple access) PON (passive optical network) OLT (optical line terminal) system configured to transmit downstream a larger amount of data from an OLT to an ONT (optical network terminal) than to transmit upstream an amount of data from the ONT to the OLT, the transmitter comprising:
  a packet processor configured to generate internal frames from downstream directed data and to transmit downstream the internal frames such that the internal frames include destination TDMA PON port information, frame identification information, and a bandwidth matching a maximum amount of downstream traffic;
  a switch configured to be able to transmit downstream the internal frames received from the packet processor to every TDMA PON MAC (medium access control) processors coupled to the switch;
  the TDMA PON MAC processors coupled to the switch, the TDMA PON MAC processors configured to be able to receive the internal frames transmitted from the switch and to convert the internal frames into TDMA PON frames; and
  optical transceivers configured to convert the TDMA PON frames output from the TDMA PON MAC processors into optical signals and configured to transmit the optical signals to the ONT at speeds corresponding to A/n wherein A corresponds the bandwidth of the internal frames and n corresponds to a ratio of downstream to upstream link speeds.

2. The transmitter of claim 1 wherein the switch transmits downstream the internal frames received from the packet processor to only M numbers of the TDMA PON MAC processors such that M numbers is less than all of the numbers of the TDMA PON MAC processors wherein.

3. The transmitter of claim 1 wherein the frame identification information comprises unicast frame identification information, multicast frame identification information, and broadcast frame identification information.

4. An optical transceiver of a TDMA (time division multiple access) PON (passive optical network) OLT (optical line terminal) system for a broadcast service comprising:
  a packet processor configured to generate internal frames from downstream directed data and to transmit downstream the internal frames such that the internal frames include destination TDMA PON port information, frame identification information, and a bandwidth matching a maximum amount of downstream traffic;
  a switch configured to be able to transmit downstream the internal frames received from the packet processor to every TDMA PON MAC (medium access control) processors coupled to the switch;
  TDMA PON MAC (medium access control) processors coupled to the switch, the TDMA PON MAC processors configured to be able to receive the internal frames transmitted from the switch and to convert the internal frames into TDMA PON frames; and
  optical transceivers configured to convert the TDMA PON frames output from the TDMA PON MAC processors into optical signals and configured to transmit the optical signals to an ONT (optical network terminal) at speeds corresponding to A/n wherein A corresponds the bandwidth of the internal frames and n corresponds to a ratio of downstream to upstream link speeds.

5. The optical transceiver of claim 4, wherein the data is one of packet data and Ethernet frame data.

6. The optical transceiver of claim 4, wherein the packet processor adds identification codes to a reserved header of the internal frames.

7. The optical transceiver of claim 4, wherein the switch transmits to the internal frames to only M number of TDMA PON MAC processors wherein M number of TDMA PON MAC processors is less than all TDMA PON MAC processors.

* * * * *